United States Patent [19]

Gego et al.

[11] 4,069,885
[45] Jan. 24, 1978

[54] TRACTOR-IMPLEMENT ARRANGEMENT FOR ESTABLISHING FRICTIONAL ENGAGEMENT THEREBETWEEN

[75] Inventors: Arno Gego, Aachen; Gerhard Fussinger, Porz-Eil, both of Germany

[73] Assignee: Klockner-Humboldt-Deutz Aktiengesellschaft, Cologne, Germany

[21] Appl. No.: 737,146

[22] Filed: Oct. 29, 1976

Related U.S. Application Data

[63] Continuation of Ser. No. 562,139, March 26, 1975, abandoned.

[30] Foreign Application Priority Data

Mar. 27, 1974 Germany ............................ 2414715

[51] Int. Cl.² ............................................. B60D 1/00
[52] U.S. Cl. ................................... 180/14 B; 172/79; 172/272; 280/477
[58] Field of Search ................. 180/14 B, 14 A, 14 R, 180/14 E; 172/272, 79, 125, 74, 76; 280/477, 479 A

[56] References Cited
U.S. PATENT DOCUMENTS

| 2,022,387 | 11/1935 | Reid | 180/14 B |
|---|---|---|---|
| 2,865,160 | 2/1958 | Farwell | 172/79 |
| 2,869,660 | 1/1959 | Miller et al. | 180/14 R |
| 3,299,979 | 1/1967 | Restall | 180/14 R |
| 3,385,388 | 5/1968 | Restall | 180/14 R |
| 3,648,794 | 3/1972 | Clepper | 180/14 R |
| 3,773,129 | 11/1973 | Anderson | 180/14 B |
| 3,822,756 | 7/1974 | Martin | 180/14 R |
| 3,871,463 | 3/1975 | Geisthaff | 180/14 B |

Primary Examiner—Joseph F. Peters, Jr.
Assistant Examiner—Jack D. Rubenstein
Attorney, Agent, or Firm—Walter Becker

[57] ABSTRACT

A tractor-implement arrangement for establishing a frictional connection between the power take-off shaft of a tractor and a Cardan shaft for the drive of a movable implement by an automatic coupling of members respectivaly connected to the power take-off shaft and the Cardan shaft. Tne implement is connected to the tractor by means of automatically interengaging coupling members or elements while one and/or the other coupling element of the power take-off or Cardan shaft is axially displaceable while being spring urged. The Cardan shaft is supported by suitable holding means and is liftable by a lifting device. The Cardan shaft is moved first by guiding the same along an inclined plane toward the take-off shaft and is frictionally coupled thereto whereupon the implement is mounted on the tractor by interengagement of additional coupling members.

5 Claims, 1 Drawing Figure

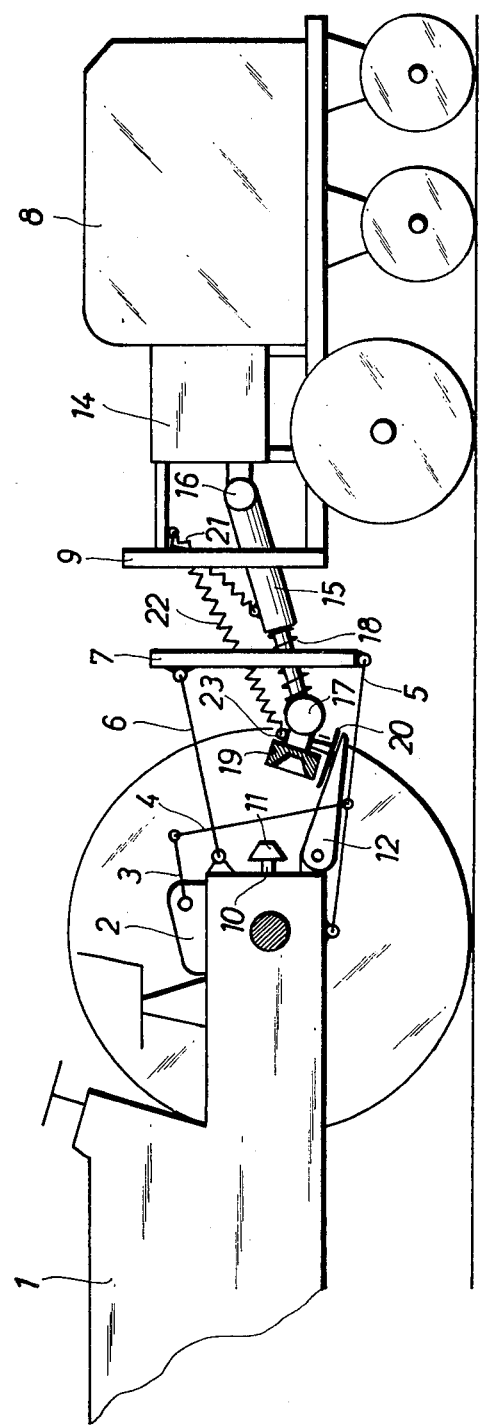

TRACTOR-IMPLEMENT ARRANGEMENT FOR ESTABLISHING FRICTIONAL ENGAGEMENT THEREBETWEEN

This is a continuation of application Ser. No. 562,139, filed Mar. 26, 1975, now abandoned.

The present invention relates to a method of and device for establishing a frictional connection between the power take-off shaft of a tractor and the Cardan shaft or universal joint shaft for the drive of a movable working implement by an automatic coupling of the coupling elements respectively provided on the power take-off shaft and Cardan shaft when attaching the working implement to the tractor, by means of automatically engaging coupling elements while one and/or the other coupling member of the power take-off shaft and Cardan shaft axially displaceable relative to each other is or are spring urged and while the Cardan shaft is liftably supported at a suitable holding means by means of the end to be coupled.

A device of this general type has become known by means of which when attaching a working implement, its Cardan shaft is automatically coupled to the power take-off shaft of the tractor. The lifting of the Cardan shaft to the height of the power take-off shaft is effected when lifting the center pole or wagon shaft of the working element. More specifically, this is done by the power operable hoist with the tractor connected to the lower control levers of said hoist grasping below the center pole of the working implement. The power take-off shaft, however, is so arranged on the rear end of the tractor that it cannot be properly seen from the driver's cab where the actuating elements of the hoist are located. The coupling of the Cardan shaft to the power take-off shaft is thus rather awkward with this heretofore known device because a reliable horizontal and vertical guiding of the drive or Cardan shaft for coupling onto the power take-off shaft is lacking.

It is, therefore, an object of the present invention to provide a method and device for establishing a frictional connection between the Cardan shaft and the power take-off shaft of a tractor by means of which an automatic coupling of the two shafts can be effected in a very simple manner.

These objects and other objects and advantages of the invention will appear more clearly from the following specification diagrammatically illustrating an embodiment of the device according to the present invention.

The problem underlying the present invention has been solved in conformity with the present invention by first moving the Cardan shaft for guiding the same on an inclined plane relative to and toward the power take-off shaft and coupling said Cardan shaft to said power take-off shaft whereupon the attachment of the working implement to the tractor is effected by engagement of the coupling elements.

In this way, when attaching a working implement with Cardan shaft to a tractor, an automatic movement of the Cardan shaft to the power take-off shaft is provided for so that the coupling of the two shafts to each other will be effected without special efforts on the part of the driver during the attachment of the working implement.

An advantageous device for carrying out the method according to the invention consists in that on the tractor below the power take-off shaft there is provided an inclined guiding trough, while underneath the free end of the Cardan shaft there is arranged a sliding shoe which is connected to the Cardan shaft in a substantially torque-free manner and is shaped in conformity with the guiding trough. It may be advantageous in this connection to connect the guiding trough pivotally to the tractor and to provide means for arresting said guiding trough. When utilizing coupling means adapted to be locked between the power take-off shaft and the Cardan shaft, it is expedient to arrange in the tractor the device for actuating the latching or locking means for the guiding trough.

Referring now to the drawing in detail, the arrangement shown therein comprises a tractor 1 which is only partially shown. On the rear end of said tractor 1 there is provided a power operable hoist 2 which through the intervention of lifting arms 3 and lifting bars 4 is pivotally connected to the lower control levers 5 of an implement attaching device. The specific attachable implement shown in the drawing represents a three-point attachable implement which comprises two lower control levers 5 (one only being shown) and one upper control lever 6. At the side of the implement and on the levers 5 and 6 there is mounted a frame 7 or implement attaching means of inverted V shape which forms a coupling element between the tractor 1 and the side thereof which faces toward the tractor 1 has a connecting device 9 for engagement by the frame 7. The connecting device or attaching means 9 in conformity with the frame 7 is provided with a recess of inverted V shape which can be engaged by the frame 7 when the latter is lifted by means of the hoist 2 and the tractor occupies a corresponding position relative to the working implement 8 so that a positive engagement between the devices 7 and 9 can be established. At the rear end of the tractor 1 there is provided a power take-off shaft 10 and the free end thereof is provided with the drive coupling member 11.

Below the power take-off shaft 10 there is located a guiding trough 12 which with its upper guiding surface, in the illustrated working position, forms an inclined plane which declines in rearward direction. The guiding trough 12 is pivotable out of the way downwardly so that the rear side of the tractor 1 is easily accessible whenever desired. Of course, the guiding trough 12 has a non-illustrated arresting device associated therewith which is effective at least in the end positions of the guiding trough and which may be of any standard type. The working implement 8 is provided with a transmission 14 adapted to be driven by a capsuled Cardan shaft or drive shaft 15 which is extensible in its longitudinal direction. The Cardan shaft 15 has two joints 16 and 17 and is illustrated while it has its maximum length as urged by a spring 18. That end of the Cardan shaft 15 which faces toward the tractor 1 is equipped with a driven coupling member 19. This coupling member 19 is so designed that it is able to engage the coupling member 11 on the power take-off shaft 10. Below the coupling member 19 there is provided a sliding shoe 20 which is held on the power take-off shaft in a substantially torque-free manner. The shoe 20 has a shape in conformity with the guiding trough 12. The Cardan shaft 15 is held in the illustrated position by two tension springs 21 and 22 which engage shaft 15 and a stationary point. The tension spring 22 engages a holding member 23 which, similar to the sliding shoe 20 is arranged on a nonrotatable housing part of the Cardan shaft.

For coupling the working implement 8 to the tractor 1, the tractor is moved in rearward direction relative to the working implement 8 so that the sliding shoe 20 engages the guiding trough 12 which is well visible from the driver's cab and by further moving the tractor backwardly will slide in or on the guiding trough 12 until the coupling member 19 of the Cardan shaft 15 engages the coupling member 11 of the power take-off shaft 10. In this way, a frictional connection is established between the power take-off shaft 10 and the Cardan shaft 15. By further moving the tractor 1 backwardly, the telescope-like Cardan shaft 15 is shortened in its length against the thrust of spring 18, and frame 7 on the attaching device moves below the connecting device 9 of the working implement 8. When actuating the power operable hoist 2, frame 7 engages the connecting device 9, and the working implement 8 thus is connected through the implement attaching device to the tractor 1. In this way, the coupling and the disengagement of the working implement 8 including the countershaft 15 can be effected without the driver having to leave the driver's cab.

It is, of course, to be understood, that the present invention is, by no means, limited to the specific showing in the drawing but also comprises any modifications within the scope of the appended claims.

What we claim is:

1. In the combination of a tractor and implement to be towed by said tractor, including means for connecting said tractor to said implement, a take-off shaft on said tractor having a drive coupling on its rear end, a Cardan shaft on said implement having a driven coupling on its forward end for driving engagement with said drive coupling, said Cardan shaft being extensible and including spring means to hold it resiliently extended and two pivotal joints, including a pivotal joint adjacent its forward end, connecting said driven coupling to said shaft, and a second joint adjacent said implement for vertical pivotal movement of said shaft, a guiding element pivotally connected to said tractor below said take-off shaft and inclined downwardly and rearwardly, a nonrotatable guiding shoe located on said drive coupling for rotatably supporting said driven coupling, resilient means supporting said Cardan shaft against vertical downward movement and in position for said shoe to engage said guiding element, so that said guiding element guides said shoe and driven coupling into engagement with said drive coupling when said tractor moves toward said implement for connecting to said implement, said pivotal joints being spaced on said shaft, and said resilient means supporting said Cardan shaft support said shaft against downward movement about the rearward pivotal joint and also support said driven coupling against downward movement about the forward pivotal joint.

2. In the combination as claimed in claim 1, in which said resilient means includes a spring connected to said driven coupling to raise said coupling.

3. In the combination as claimed in claim 1, in which said guiding element is a guiding trough open at its top, and said shoe is formed complementary to said trough.

4. In the combination as claimed in claim 1, in which said tractor and implement have complementary engaging means, and said tractor includes hoisting means on said tractor to raise said engaging means on the tractor to register with the engaging means on said implement.

5. In the combination as claimed in claim 1, in which said means for connecting said tractor and implement includes vertical complementary frames on said tractor and said implement, and hoisting means on said tractor for raising said frame on said tractor to register with the frame on said implement.

* * * * *